US006925223B2

(12) United States Patent
Wong

(10) Patent No.: US 6,925,223 B2
(45) Date of Patent: Aug. 2, 2005

(54) PRESSURE ACTUATED OPTICAL LATCHING RELAY

(75) Inventor: Marvin Glenn Wong, Woodland Park, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/412,874

(22) Filed: Apr. 14, 2003

(65) Prior Publication Data

US 2004/0202408 A1 Oct. 14, 2004

(51) Int. Cl.$^7$ ............................... G02B 6/26; G02B 6/42
(52) U.S. Cl. ............................. 385/18; 385/16; 385/17; 385/19; 385/22; 359/877; 359/878
(58) Field of Search ............................. 385/16–19, 22; 359/871, 877, 878

(56) References Cited

U.S. PATENT DOCUMENTS

| | | | |
|---|---|---|---|
| 2,312,672 A | 3/1943 | Pollard, Jr. | 335/58 |
| 2,564,081 A | 8/1951 | Schilling | 335/56 |
| 3,430,020 A | 2/1969 | Tomkewitsch et al. | 200/181 |
| 3,529,268 A | 9/1970 | Rauterberg | 335/56 |
| 3,600,537 A | 8/1971 | Twyford | 200/152 |
| 3,639,165 A | 2/1972 | Rairden, III | 117/227 |
| 3,657,647 A | 4/1972 | Beusman et al. | 324/94 |
| 4,103,135 A | 7/1978 | Gomez et al. | 200/185 |

(Continued)

FOREIGN PATENT DOCUMENTS

| | | | | |
|---|---|---|---|---|
| EP | 0593836 A1 | 10/1992 | | G02B/6/28 |
| FR | 2418539 A | 9/1979 | | H01H/57/00 |
| FR | 2458138 A1 | 10/1980 | | H01H/29/18 |
| FR | 2667396 | 9/1990 | | |
| JP | SHO 36-18575 | 10/1961 | | H01H/29/00 |
| JP | SHO 47-21645 | 10/1972 | | H01H/29/00 |
| JP | 63-276838 | 5/1987 | | |
| JP | 01-294317 | 5/1988 | | H01H/1/06 |
| JP | 08-125487 A | 5/1996 | | H02H/9/17 |
| JP | 9161640 A | 6/1997 | | H01H/61/00 |
| WO | WO 99/46624 A1 | 9/1999 | | |

OTHER PUBLICATIONS

Bhedwar, Homi C. et al. "Ceramic Multilayer Package Fabrication." Electronic Materials Handbook, Nov. 1989, pp. 460–469, vol. 1 Packaging, Section 4: Packages.

"Integral Power Resistors for Aluminum Substrate." IBM Technical Disclosure Bulletin, Jun. 1984, US, Jun. 1, 1984, p. 827, vol. 27, No. 1B, TDB–ACC–NO: NB8406827, Cross Reference: 0018–8689–27–1B–827.

Kim, Joonwon et al. "A Micromechanical Switch with Electrostatically Driven Liquid–Metal Droplet." Sensors and Actuators, A: Physical, v 9798, Apr. 1, 2002, 4 pages.

Jonathan Simon, "A Liquid–Filled Microrelay with a Moving Mercury Microdrop" (Sep. 1997) Journal of Microelectromechanical Systems, vol. 6, No. 3, pp. 208–216.

Marvin Glenn Wong, "A Piezoelectrically Actuated Liquid Metal Switch", May 1, 2002, U.S. Appl. No. 10/137,691, 12 pages of specification, 5 pages of claims, 1 page of abstract, and 10 sheets of drawings (Figs. 1–10).

*Primary Examiner*—Brian Healy
*Assistant Examiner*—Daniel Petkovsek

(57) ABSTRACT

A pressure actuated optical relay containing a transparent mirror housing, located at the intersection of two optical paths. A liquid metal slug is moved within a channel passing through the transparent mirror housing by the action of pressure exerted by an actuation fluid. The liquid metal slug is moved in or out of the transparent mirror housing to select between the optical paths. When the liquid metal slug is within the optical path, an incoming optical signal is reflected from a reflective surface of the slug. The liquid metal of the slug adheres to wettable metal surfaces within the channel to provide a latching mechanism.

21 Claims, 7 Drawing Sheets

U.S. PATENT DOCUMENTS

| | | | |
|---|---|---|---|
| 4,200,779 A | 4/1980 | Zakurdaev et al. | 200/187 |
| 4,238,748 A | 12/1980 | Goullin et al. | 335/56 |
| 4,245,886 A | 1/1981 | Kolodzey et al. | 385/19 |
| 4,336,570 A | 6/1982 | Brower | 362/4 |
| 4,384,761 A * | 5/1983 | Brady et al. | 385/23 |
| 4,419,650 A | 12/1983 | John | 337/119 |
| 4,434,337 A | 2/1984 | Becker | 200/220 |
| 4,475,033 A | 10/1984 | Willemsen et al. | 250/227 |
| 4,505,539 A | 3/1985 | Auracher et al. | 385/19 |
| 4,582,391 A | 4/1986 | Legrand | 385/17 |
| 4,628,161 A | 12/1986 | Thackrey | 200/61.47 |
| 4,652,710 A | 3/1987 | Karnowsky et al. | 200/235 |
| 4,657,339 A | 4/1987 | Fick | 385/22 |
| 4,742,263 A | 5/1988 | Harnden, Jr. et al. | 310/331 |
| 4,786,130 A | 11/1988 | Georgiou et al. | 385/48 |
| 4,797,519 A | 1/1989 | Elenbaas | 220/226 |
| 4,804,932 A | 2/1989 | Akanuma et al. | 335/58 |
| 4,988,157 A | 1/1991 | Jackel et al. | 385/17 |
| 4,989,946 A * | 2/1991 | Williams et al. | 385/16 |
| 5,278,012 A | 1/1994 | Yamanaka et al. | 430/30 |
| 5,415,026 A | 5/1995 | Ford | 73/651 |
| 5,502,781 A | 3/1996 | Li et al. | 385/4 |
| 5,644,676 A | 7/1997 | Blomberg et al. | 392/407 |
| 5,675,310 A | 10/1997 | Wojnarowski et al. | 338/309 |
| 5,677,823 A | 10/1997 | Smith | 361/234 |
| 5,751,074 A | 5/1998 | Prior et al. | 307/118 |
| 5,751,552 A | 5/1998 | Scanlan et al. | 361/707 |
| 5,828,799 A | 10/1998 | Donald | 385/16 |
| 5,841,686 A | 11/1998 | Chu et al. | 365/51 |
| 5,849,623 A | 12/1998 | Wojnarowski et al. | 438/382 |
| 5,874,770 A | 2/1999 | Saia et al. | 257/536 |
| 5,875,531 A | 3/1999 | Nellissen et al. | 29/25.35 |
| 5,886,407 A | 3/1999 | Polese et al. | 257/706 |
| 5,889,325 A | 3/1999 | Uchida et al. | 257/724 |
| 5,912,606 A | 6/1999 | Nathanson et al. | 335/47 |
| 5,915,050 A | 6/1999 | Russell et al. | 385/7 |
| 5,972,737 A | 10/1999 | Polese et al. | 438/122 |
| 5,994,750 A | 11/1999 | Yagi | 257/415 |
| 6,021,048 A | 2/2000 | Smith | 361/735 |
| 6,072,924 A * | 6/2000 | Sato et al. | 385/18 |
| 6,180,873 B1 | 1/2001 | Bitko | 174/9 F |
| 6,201,682 B1 | 3/2001 | Mooij et al. | 361/306.1 |
| 6,207,234 B1 | 3/2001 | Jiang | 427/333 |
| 6,212,308 B1 | 4/2001 | Donald | 385/16 |
| 6,225,133 B1 | 5/2001 | Yamamichi et al. | 438/3 |
| 6,278,541 B1 | 8/2001 | Baker | 359/291 |
| 6,304,450 B1 | 10/2001 | Dibene, II et al. | 361/704 |
| 6,320,994 B1 | 11/2001 | Donald et al. | 385/16 |
| 6,323,447 B1 | 11/2001 | Kondoh et al. | 200/182 |
| 6,351,579 B1 | 2/2002 | Early et al. | 385/18 |
| 6,356,679 B1 | 3/2002 | Kapany | 385/18 |
| 6,360,775 B1 * | 3/2002 | Barth et al. | 137/828 |
| 6,373,356 B1 | 4/2002 | Gutierrez et al. | 335/47 |
| 6,396,012 B1 | 5/2002 | Bloomfield | 200/233 |
| 6,396,371 B2 | 5/2002 | Streeter et al. | 335/78 |
| 6,408,112 B1 | 6/2002 | Bartels | 385/16 |
| 6,446,317 B1 | 9/2002 | Figueroa et al. | 29/25.42 |
| 6,453,086 B1 | 9/2002 | Tarazona | 385/20 |
| 6,470,106 B2 | 10/2002 | McClelland et al. | 385/16 |
| 6,487,333 B2 | 11/2002 | Fouquet | 385/18 |
| 6,501,354 B1 | 12/2002 | Gutierrez et al. | 335/47 |
| 6,512,322 B1 | 1/2003 | Fong et al. | 310/328 |
| 6,515,404 B1 | 2/2003 | Wong | 310/328 |
| 6,516,504 B2 | 2/2003 | Schaper | 29/25.42 |
| 6,559,420 B1 | 5/2003 | Zarev | 219/209 |
| 6,633,213 B1 | 10/2003 | Dove | 335/78 |
| 2002/0037128 A1 | 3/2002 | Burger et al. | 385/16 |
| 2002/0146197 A1 | 10/2002 | Yong | 385/17 |
| 2002/0150323 A1 | 10/2002 | Nishida et al. | 385/16 |
| 2002/0168133 A1 | 11/2002 | Saito | 385/16 |
| 2003/0002778 A1 * | 1/2003 | Bach et al. | 385/16 |
| 2003/0012483 A1 * | 1/2003 | Ticknor et al. | 385/16 |
| 2003/0035611 A1 | 2/2003 | Shi | 385/16 |

\* cited by examiner

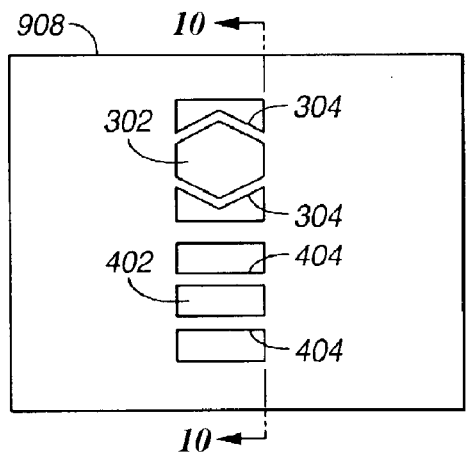
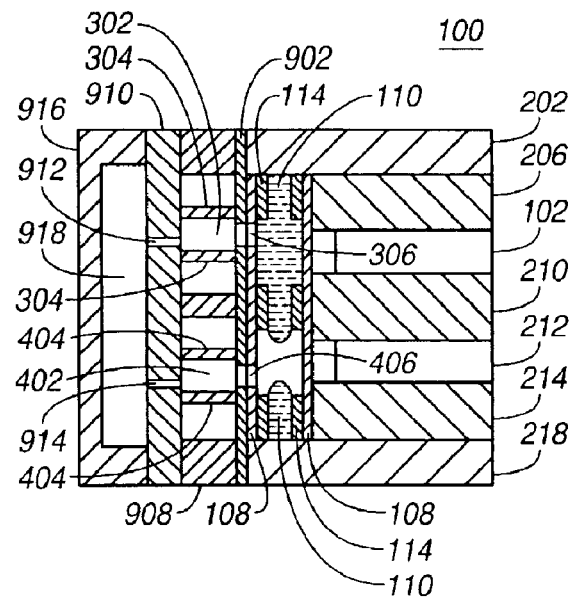
FIG. 9          FIG. 10
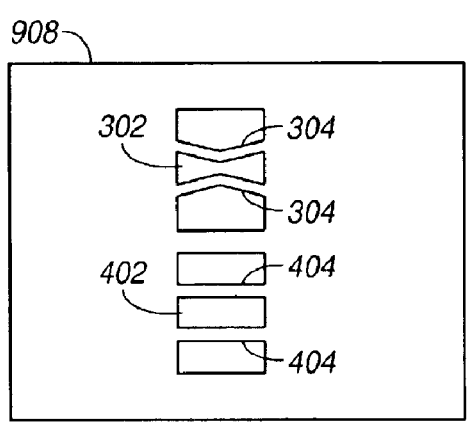
FIG. 11

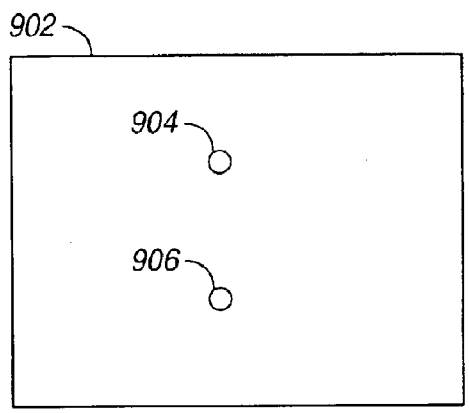
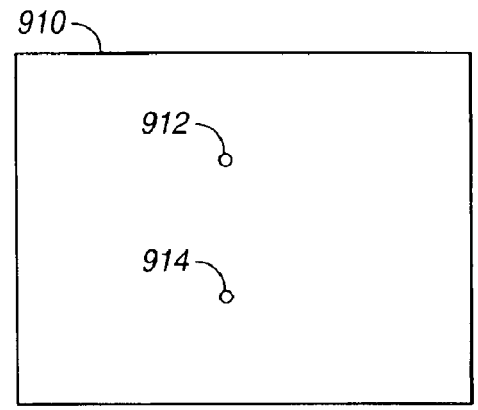
FIG. 12  FIG. 13
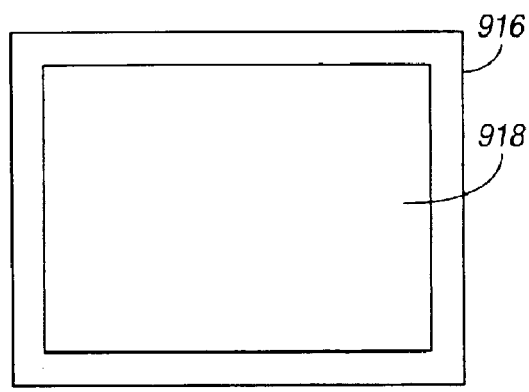
FIG. 14

PRESSURE ACTUATED OPTICAL LATCHING RELAY

CROSS REFERENCE TO RELATED APPLICATIONS

This application is related to the following co-pending U.S. patent applications, being identified by the below enumerated identifiers and arranged in alphanumerical order, which have the same ownership as the present application and to that extent are related to the present application and which are hereby incorporated by reference:

Application 10010448-1, titled "Piezoelectrically Actuated Liquid Metal Switch", filed May 2, 2002 and identified by Ser. No. 10/137,691;

Application 10010529-1, "Bending Mode Latching Relay", and having the same filing date as the present application;

Application 10010531-1, "High Frequency Bending Mode Latching Relay", and having the same filing date as the present application;

Application 10010570-1, titled "Piezoelectrically Actuated Liquid Metal Switch", filed May 2, 2002 and identified by Ser. No. 10/142,076;

Application 10010571-1, "High-frequency, Liquid Metal, Latching Relay with Face Contact", and having the same filing date as the present application;

Application 10010572-1, "Liquid Metal, Latching Relay with Face Contact", and having the same filing date as the present application;

Application 10010573-1, "Insertion Type Liquid Metal Latching Relay", and having the same filing date as the present application;

Application 10010617-1, "High-frequency, Liquid Metal, Latching Relay Array", and having the same filing date as the present application;

Application 10010618-1, "Insertion Type Liquid Metal Latching Relay Array", and having the same filing date as the present application;

Application 10010634-1, "Liquid Metal Optical Relay", and having the same filing date as the present application;

Application 10010640-1, titled "A Longitudinal Piezoelectric Optical Latching Relay", filed Oct. 31, 2001 and identified by Ser. No. 09/999,590;

Application 10010643-1, "Shear Mode Liquid Metal Switch", and having the same filing date as the present application;

Application 10010644-1, "Bending Mode Liquid Metal Switch", and having the same filing date as the present application;

Application 10010656-1, titled "A Longitudinal Mode Optical Latching Relay", and having the same filing date as the present application;

Application 10010663-1, "Method and Structure for a Pusher-Mode Piezoelectrically Actuated Liquid Metal Switch", and having the same filing date as the present application;

Application 10010664-1, "Method and Structure for a Pusher-Mode Piezoelectrically Actuated Liquid Metal Optical Switch", and having the same filing date as the present application;

Application 10010790-1, titled "Switch and Production Thereof", filed Dec. 12, 2002 and identified by Ser. No. 10/317,597;

Application 10011055-1, "High Frequency Latching Relay with Bending Switch Bar", and having the same filing date as the present application;

Application 10011056-1, "Latching Relay with Switch Bar", and having the same filing date as the present application;

Application 10011064-1, "High Frequency Push-mode Latching Relay", and having the same filing date as the present application;

Application 10011065-1, "Push-mode Latching Relay", and having the same filing date as the present application;

Application 10011121-1, "Closed Loop Piezoelectric Pump", and having the same filing date as the present application;

Application 10011329-1, titled "Solid Slug Longitudinal Piezoelectric Latching Relay", filed May 2, 2002 and identified by Ser. No. 10/137,692;

Application 10011344-1, "Method and Structure for a Slug Pusher-Mode Piezoelectrically Actuated Liquid Metal Switch", and having the same filing date as the present application;

Application 10011345-1, "Method and Structure for a Slug Assisted Longitudinal Piezoelectrically Actuated Liquid Metal Optical Switch", and having the same filing date as the present application;

Application 10011397-1, "Method and Structure for a Slug Assisted Pusher-Mode Piezoelectrically Actuated Liquid Metal Optical Switch", and having the same filing date as the present application;

Application 10011398-1, "Polymeric Liquid Metal Switch", and having the same filing date as the present application;

Application 10011410-1, "Polymeric Liquid Metal Optical Switch", and having the same filing date as the present application;

Application 10011436-1, "Longitudinal Electromagnetic Latching Optical Relay", and having the same filing date as the present application;

Application 10011437-1, "Longitudinal Electromagnetic Latching Relay", and having the same filing date as the present application;

Application 10011458-1, "Damped Longitudinal Mode Optical Latching Relay", and having the same filing date as the present application;

Application 10011459-1, "Damped Longitudinal Mode Latching Relay", and having the same filing date as the present application;

Application 10020013-1, titled "Switch and Method for Producing the Same", filed Dec. 12, 2002 and identified by Ser. No. 10/317,963;

Application 10020027-1, titled "Piezoelectric Optical Relay", filed Mar. 28, 2002 and identified by Ser. No. 10/109,309;

Application 10020071-1, titled "Electrically Isolated Liquid Metal Micro-Switches for Integrally Shielded Microcircuits", filed Oct. 8, 2002 and identified by Ser. No. 10/266,872;

Application 10020073-1, titled "Piezoelectric Optical Demultiplexing Switch", filed Apr. 10, 2002 and identified by Ser. No. 10/119,503;

Application 10020162-1, titled "Volume Adjustment Apparatus and Method for Use", filed Dec. 12, 2002 and identified by Ser. No. 10/317,293;

Application 10020241-1, "Method and Apparatus for Maintaining a Liquid Metal Switch in a Ready-to-Switch Condition", and having the same filing date as the present application;

Application 10020242-1, titled "A Longitudinal Mode Solid Slug Optical Latching Relay", and having the same filing date as the present application;

Application 10020473-1, titled "Reflecting Wedge Optical Wavelength Multiplexer/Demultiplexer", and having the same filing date as the present application;

Application 10020540-1, "Method and Structure for a Solid Slug Caterpillar Piezoelectric Relay", and having the same filing date as the present application;

Application 10020541-1, titled "Method and Structure for a Solid Slug Caterpillar Piezoelectric Optical Relay", and having the same filing date as the present application;

Application 10030438-1, "Inserting-finger Liquid Metal Relay", and having the same filing date as the present application;

Application 10030440-1, "Wetting Finger Liquid Metal Latching Relay", and having the same filing date as the present application;

Application 10030522-1, "Pressure Actuated Solid Slug Optical Latching Relay", and having the same filing date as the present application; and Application 10030546-1, "Method and Structure for a Slug Caterpillar Piezoelectric Reflective Optical Relay", and having the same filing date as the present application.

FIELD OF THE INVENTION

The invention relates to the field of optical switching relays, and in particular to a pressure actuated optical relay that latches by means of a liquid metal.

BACKGROUND

Communications systems using optical signals require the use of optical switches and routers. An early approach to optical switching was to convert the optical signal to an electrical signal, use an electrical switch or router and then convert back to an optical signal. More recently, optical relays have been used in which an electrical control signal is used to control the switching or routing of an optical signal. Optical relays typically switch optical signals by using movable solid mirrors or by using the creation of bubbles in liquid. The moveable mirrors may use electrostatic latching mechanisms, whereas bubble switches do not latch. Piezoelectric latching relays either use residual charges in the piezoelectric material to latch, or actuate switch contacts containing a latching mechanism.

SUMMARY

This invention relates to a pressure actuated optical relay that uses a liquid metal, such as mercury, as a switching mechanism and as a latching mechanism. The relay contains a transparent mirror housing, located at the intersection of two optical paths. A liquid metal slug is moved within a channel passing through the transparent mirror housing by the action of pressure in an actuation fluid. The surface of the liquid metal slug forms a reflective surface. The liquid metal slug is moved in or out of the transparent mirror housing to select between the optical paths. When the liquid metal slug is within the optical path, an incoming optical signal is reflected from the reflective surface of the liquid metal, otherwise the optical signal passes through the transparent housing. Wettable metal surfaces within the channel provide a latching mechanism.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 9 is a top view of a piezoelectric layer of an optical relay consistent with certain embodiments of the present invention utilizing piezoelectric elements operating in a shearing mode.

FIG. 10 is a sectional view through an optical relay consistent with certain embodiments of the present invention utilizing piezoelectric elements operating in a shearing mode.

FIG. 11 is a further top view of a piezoelectric layer of an optical relay consistent with certain embodiments of the present invention utilizing piezoelectric elements operating in a shearing mode.

FIG. 12 is a view of a first -spacer layer of an optical relay consistent with certain embodiments of the present invention.

FIG. 13 is a view of a second spacer layer of an optical relay consistent with certain embodiments of the present invention.

FIG. 14 is a view of a chamber layer of an optical relay consistent with certain embodiments of the present invention.

DETAILED DESCRIPTION

Figure 1:
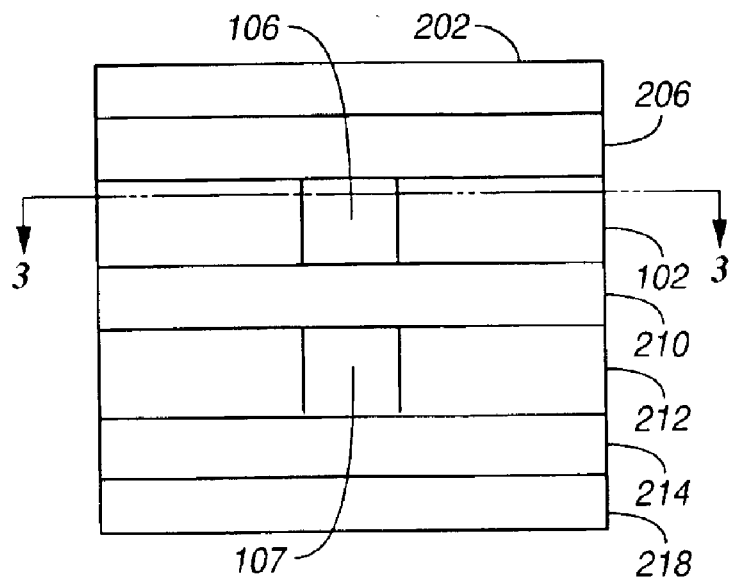
FIG. 1 is a side view of an optical relay consistent with certain embodiments of the present invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The present invention relates to an optical relay that latches by means of a liquid metal. The liquid metal may be mercury or an alloy that contains gallium. When a small volume of liquid metal wets a surface, the surface tension of liquid metal tends to hold the liquid metal to the surface. In an optical relay of the present invention, a liquid metal slug is used to select between two or more optical paths. Surface tension is used as a latching mechanism to maintain the position of the liquid metal slug.

The relay operates by means of a pressure actuator displacing a liquid metal slug and causing it to wet between contact pads to block an optical path and reflect an optical signal into an alternate path. The pressure acting on the liquid metal between contact pads is increased to break the surface tension bond. This separates the liquid metal into two volumes and unblocks the optical path. The switch latches by means of surface tension and the liquid metal wetting to the contact pads. The liquid metal slug can wet to wettable metal elements in the optical path cavity, thereby creating a mirror effect that can be used to redirect the optical signal in a different direction.

In one embodiment, the switch is made using micro-machining techniques for small size. The micro-machined optical relay of the present invention is made up of a number of layers. FIG. 1 is side view of an optical relay 100 of one embodiment of the present invention. Referring to FIG. 1, the upper optical layer 102 contains an input optical path or waveguide and two output optical paths or waveguides. One of the output waveguides 106 constitutes part of a first reflected path through the relay. Waveguide 107 constitutes part of a second (optional) reflected path. Layer 212 may optionally contain additional optical waveguides and function as a lower optical layer. Layers 102 and 212 also contains pressure actuators. Layers 206, 210 and 214 are spacer layers. These layers contain seal belt metal contacts that provide the latching mechanism and will be referred to as the upper, middle and lower seal belt layers respectively. Layer 202 is a top cap layer and layer 218 is a bottom cap layer.

Figure 2:
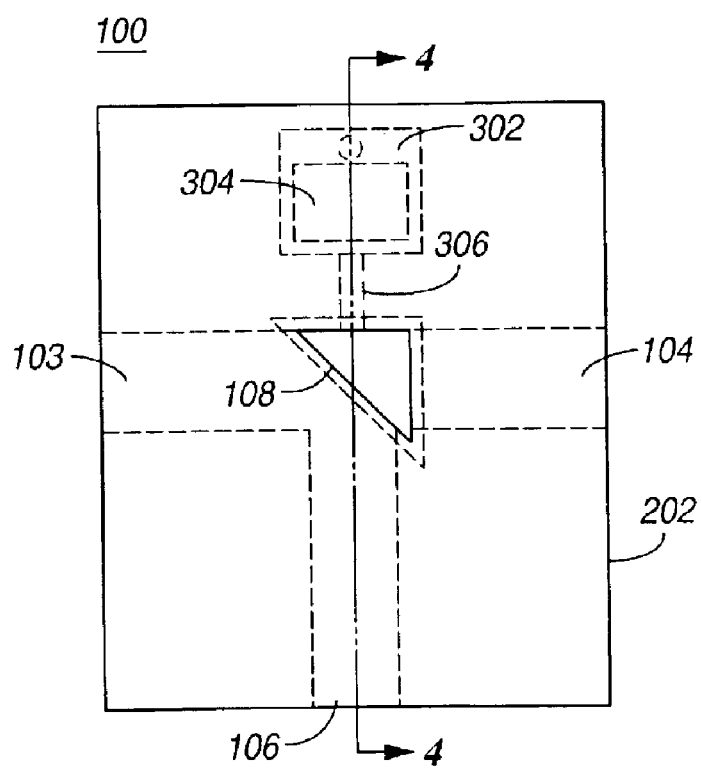
FIG. 2 is a top view of an optical relay consistent with certain embodiments of the present invention.

FIG. 2 is a top view of an optical relay in accordance with one embodiment of the invention. The broken lines indicate hidden structure that includes the input waveguide 103, the first output waveguide 104 and the second output waveguide 106. A triangular mirror housing 108 extends vertically through the optical paths. A cavity 302 contains a pressure actuator 304 and is coupled via duct 306 to the interior of the transparent mirror housing 108.

Figure 3:
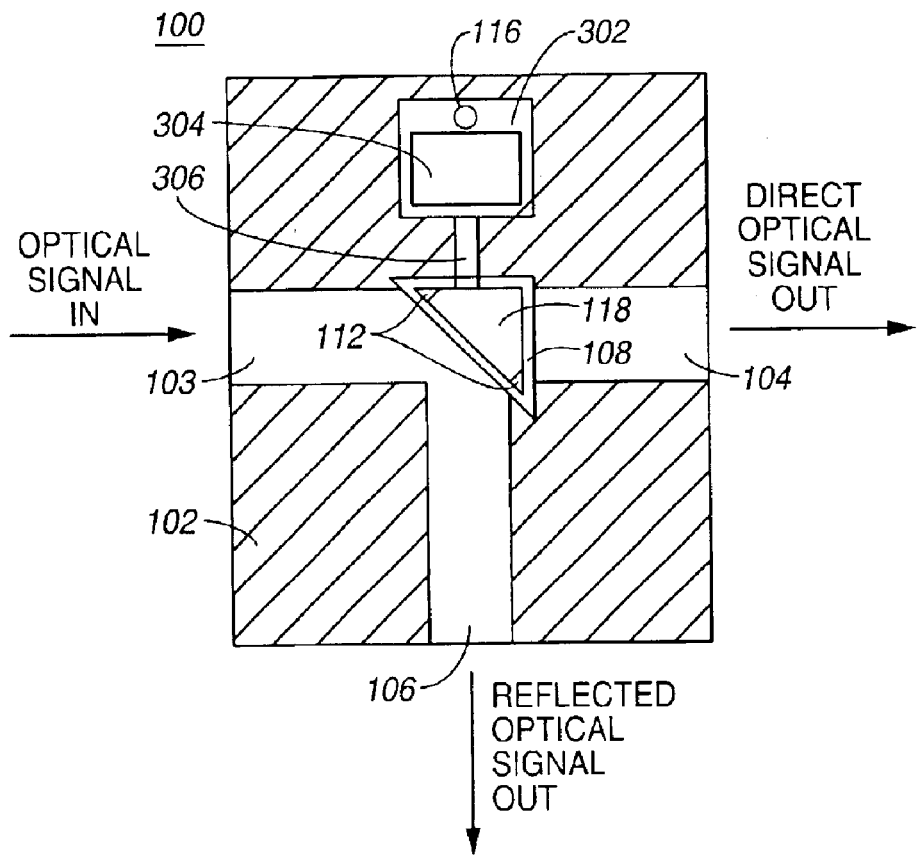
FIG. 3 is a sectional view through an optical layer of an optical relay consistent with certain embodiments of the present invention utilizing a heater.

FIG. 3 is a sectional view through the section 3—3 shown in FIG. 1. The section is taken through the upper optical layer 102. The first output waveguide 104 is optically aligned with the input waveguide 103 to form a direct optical path through the layer. A second optical output path or waveguide 106 intersects the direct optical path. In operation, an optical signal enters path 103 (from the left in the figure) and either passes directly through the relay via path 104 or is deflected to exit the relay through path 106. A transparent, hollow tube 108 is located at the intersection of the paths 103 and 106. The transparent, hollow tube 108 is also referred to as a transparent mirror housing in the sequel. The axis of tube is substantially perpendicular to the layer 102. Tubes having other than triangular cross-sectional shapes may be used, however, one face of the tube should be planar and angled so that the normal to the face bisects the angle between the path 103 and the path 106. In FIG. 3, the paths are at right angles, so the face is angled at 45°. Other angles may be used without departing from the present invention. A liquid metal slug is positioned in a switching channel 118 that passes through the transparent tube 108, and is free to slide axially along the switching channel. Surface tension in the liquid metal tends to retain the liquid metal in a single volume. Where the transparent tube passes through the optical layer, the corners of the transparent tube are filled with a wettable metal 112. The liquid metal is drawn across the face of the transparent tube by the surface tension attracting the liquid metal to the wettable metal in the corners of the tube. As a result, the surface of the liquid metal is planar and highly reflective. An optical signal entering the channel 103 is reflected from the surface of the liquid metal 108 and exits the relay through channel 106. When the liquid metal slug is moved out of the path of the optical signal, the optical signal passes through the transparent tube and exits the relay through channel 104. In operation, the liquid metal slug moves axially along the channel through the transparent tube.

Figure 4:
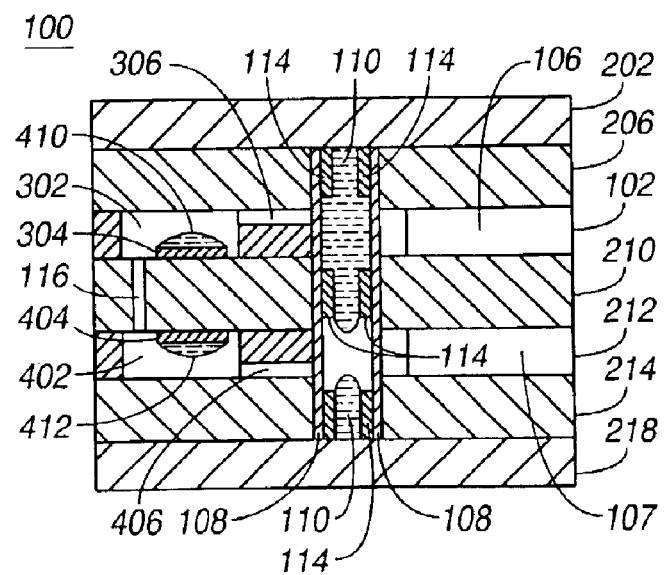
FIG. 4 is a sectional view through an optical relay array consistent with certain embodiments of the present invention utilizing a heater.

FIG. 4 shows a sectional view along the section 4—4 in FIG. 2. The optical relay 100 is made up of a number of layers that may be formed by micro-machining. Layers 206, 210 and 214 contain contact pads or seal belts 114. Theses contact pads are wettable by the liquid metal. The transparent mirror housing 108 extends between the upper seal belt layer 206 and the lower seal belt layer 214. Alternatively, two separate mirror housings may be used, one in each of the optical layers 102 and 212. In this embodiment, there are two optical layers, 102 and 212. In general, a single layer could be used or multiple layers created by stacking relays on top of each other. A liquid metal slug 110 wets between the seal belts 114 in the upper seal belt layer 206 and the middle seal belt layer 210. In this position, the liquid metal slug reflects light out of the relay along waveguide 106. The slug may be moved by increasing the pressure of an inert actuation fluid in chamber 302. The increased pressure moves actuation fluid along the duct 306 into the switching channel. This breaks the liquid connection between the upper and middle seal belts and moves some of the liquid metal down the switching channel. As a result, the liquid metal fills the space between the middle and lower seal belts (in the layers 210 and 214 respectively). Light entering the relay in the upper optical layer 102 can now pass through the transparent mirror housing and exit the relay along the direct path. Light entering the relay in the lower optical layer 212 is reflected by the liquid metal and exits the relay along path 107. In this embodiment of the invention, the pressure in chamber 302 is increased by passing an electrical current through a heater resistor 304. The heater resistor and associated circuitry may be deposited on the upper surface of layer 210 or on the lower surface of layer 206. A corresponding lower chamber 402 is connected via duct 406 to the lower part of the switching channel in the mirror housing 108. A second heater resistor 404 is positioned within the chamber and is used to move the liquid metal slug back up the switching channel. Slow pressure equalization between the upper chamber 302 and the lower chamber 402 is facilitated by a pressure relief duct 116. The cross-section and length of this duct is selected to restrict flow of actuation fluid so as to minimize impairment of the switching action.

In a further embodiment of the present invention, a phase-change liquid 410 is in wetted contact with the heater resistor 304. When heated, the liquid change from a liquid phase to a gas phase and in so doing increases in volume. This volume change increases the pressure in the actuation fluid and activates the switch. When the heater 304 cools, the phase-change liquid condenses on the heater. A second phase-change liquid 412 is in wetted contact with the lower heater 404 and operates in a similar manner. The phase-change liquid may be an inert organic liquid such as a low viscosity Fluorinert manufactured by 3M. Use of phase-change liquid may provide faster switching times as compared with gas heating and expansion. In turn, this reduces energy losses into the substrate.

Figure 5:
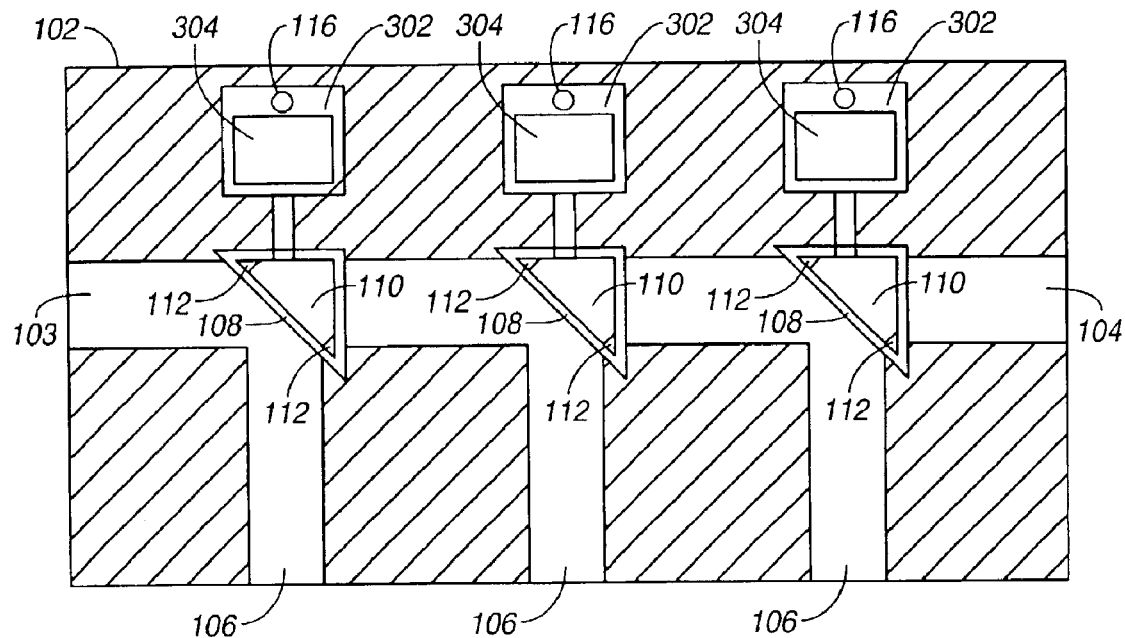
FIG. 5 is a sectional view through an optical layer of an optical relay array consistent with certain embodiments of the present invention.

As illustrated in FIG. 5, multiple relays may be integrated to form a switching array. An optical signal entering the relay array along waveguide 103 may be switched to any one of the three outputs 106 or allowed to pass directly through the relay and exit along waveguide 104.

Figure 6:
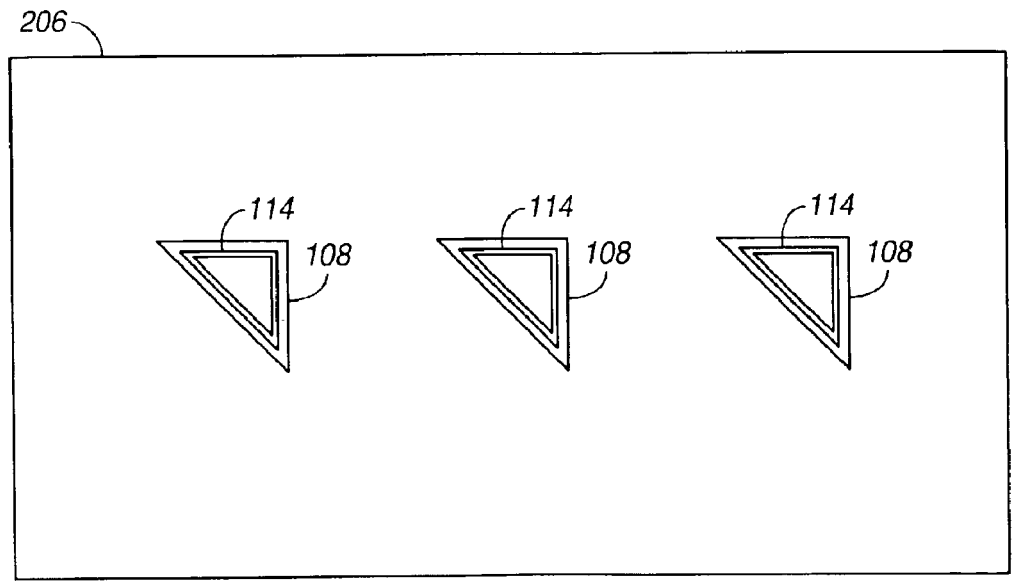
FIG. 6 is a top view of a seal belt layer of an optical relay array consistent with certain embodiments of the present invention.

FIG. 6 is a top view of the upper seal belt layer 206 of a relay array. The middle and lower seal belt layers have similar structures. In this embodiment, the transparent mirror housing 108 is held in the layer. The interior of the mirror housing is lined with seal metal 114 that is wettable by the liquid metal. Surface tension in the liquid metal resists motion of the liquid metal slug and provides a latching mechanism for the relay.

Figure 7:
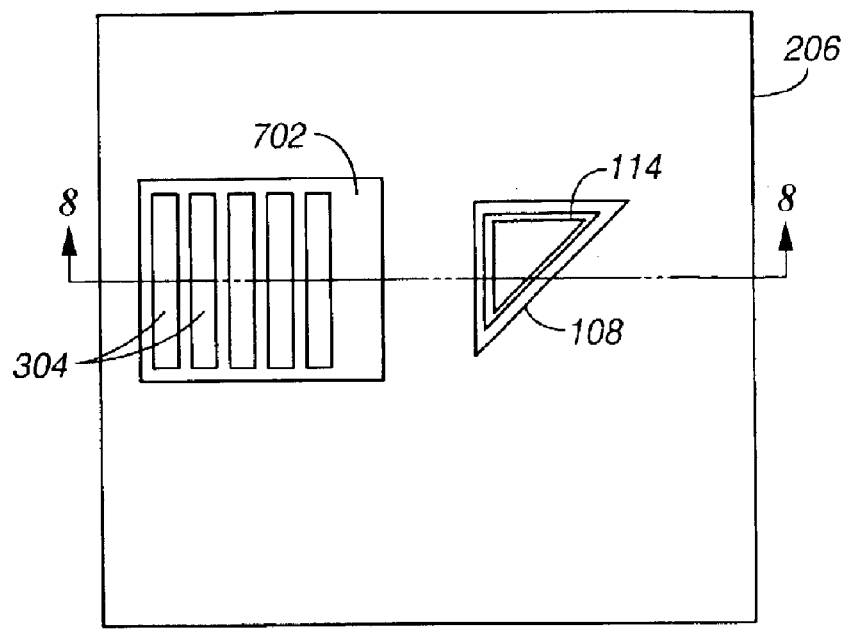
FIG. 7 is a top view of an upper actuation layer of an optical relay consistent with certain embodiments of the present invention utilizing piezoelectric elements operating in a bending mode.

A top view of a further embodiment of the invention is shown in FIG. 7. The top layer has been removed to show the upper seal belt layer 206. The lower layer 214 has a similar structure. The seal belt 114 lines the inside of the transparent mirror housing 108. The backing chamber 702 is formed in the layer to create a diaphragm. Piezoelectric elements 304 are attached to the diaphragm and are operable to deform it. The piezoelectric elements 304 are configured to deform in a bending mode when a voltage is applied across them. The polarity of the voltage determines whether the volume of the chamber 302 is increased or decreased, so the actuators may increase or decrease the pressure in the chamber. The section 8—8 is shown in FIG. 8 and is described below.

Figure 8:
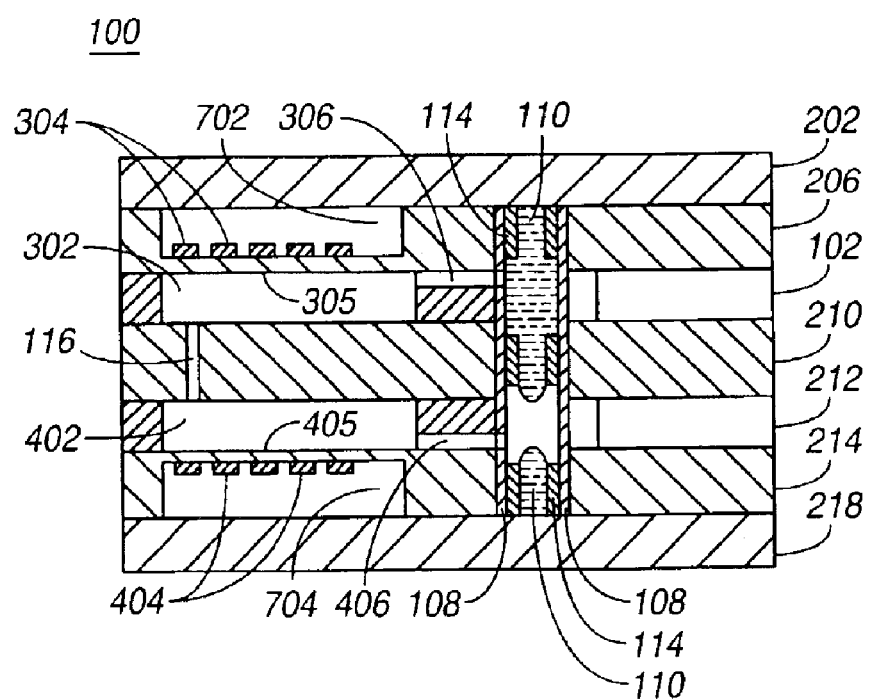
FIG. 8 is a sectional view through an optical relay consistent with certain embodiments of the present invention utilizing piezoelectric elements operating in a bending mode.

FIG. 8 is a sectional view through the section 8—8 of the relay shown in FIG. 7. In this embodiment, the pressure in chamber 302 is controlled by the action of piezoelectric elements 304 acting on a flexible diaphragm 305. A corresponding set of piezoelectric actuators 404 control the pressure in the lower chamber 402 by acting on diaphragm 405. The slug may be moved downwards by increasing the pressure in chamber 302 and, optionally, decreasing the pressure in chamber 402. The diaphragms may be formed by creating backing chambers 702 and 704 in layers 206 and 214 respectively. The backing chambers may be created by micro-machining techniques.

FIG. 9 is a side view of a further embodiment of the relay. Two outer layers have been removed to show the detail of the piezoelectric layer 908. The piezoelectric elements 304 are configured to deform in a shearing mode when a voltage is applied across them. The polarity of the voltage determines whether the volume of the chamber 302 is increased or decreased, so the actuators may increase or decrease the pressure in the chamber. A corresponding set of piezoelectric actuators 404 control the pressure in the lower chamber 402.

FIG. 10 is a sectional view through the section 10—10 of the relay in FIG. 9, and including the two outer layers 910 and 916 that were removed in FIG. 9 The embodiment includes four vertical layers: a connecting layer 902, a piezoelectric layer 908, a spacer layer 910 and a reservoir layer 916. In this embodiment, the pressure in chamber 302 is controlled by the action of piezoelectric elements 304. The piezoelectric elements 304 are configured to deform in a shearing mode when a voltage is applied across them. The polarity of the voltage determines whether the volume of the chamber 302 is increased or decreased, so the actuators may increase or decrease the pressure in the chamber. A corresponding set of piezoelectric actuators 404 control the pressure in the lower chamber 402. The slug may be moved downwards by increasing the pressure in chamber 302 and, optionally, decreasing the pressure in chamber 402. The actuators are formed in a vertical piezoelectric layer 908 that is described with reference to FIGS. 10 and 11. The action of the piezoelectric actuators 304 forces actuation fluid out of the chamber 302, through a hole 306 in a vertical connecting layer 902 and into the switching channel in the mirror housing 108. Pressure equalization is provided by a duct 912 that couples the chamber 302 to a fluid reservoir 918 in a vertical reservoir layer 916. A corresponding duct 914 couples the lower chamber 402 to the fluid reservoir 918. The ducts are formed in the vertical spacer layer 910.

FIG. 9 and FIG. 11 illustrate the operation of the piezoelectric actuators. Referring to FIG. 9, each of the actuators 304 is made up of two piezoelectric elements coupled edge to edge and deformed in a shear mode. When sheared outwards, as shown in FIG. 9, the volume of chamber 302 is increased. When sheared inwards, as shown in FIG. 11, the volume of chamber 302 is decreased. The lower actuators 404 may be operated in phase opposition to the upper actuators to increase the pressure difference across the liquid metal slug. In a further embodiment, a single pressure actuator that can both increase and decrease pressure is used. The change in pressure is used to pull the liquid metal slug in one direction and push it in the other.

A view of the connecting layer 902 is shown in FIG. 12. The connecting holes 904 and 906 are sized to allow easy flow of actuation fluid between the switching channel and the pressure chambers (302 and 402 in FIG. 10).

A view of the spacer layer 910 is shown in FIG. 13. The pressure relief ducts 912 and 914 are sized to restrict flow of actuation fluid between the fluid reservoir (918 in FIG. 10) and the pressure chambers (302 and 402 in FIG. 10). They allow fluid to enter the chamber slowly so that the liquid slug is not moved when the actuators return to their non-energized positions.

FIG. 14 is an interior view of the reservoir layer 916. The fluid reservoir 918 may be formed by micro-machining techniques.

Figure 15:
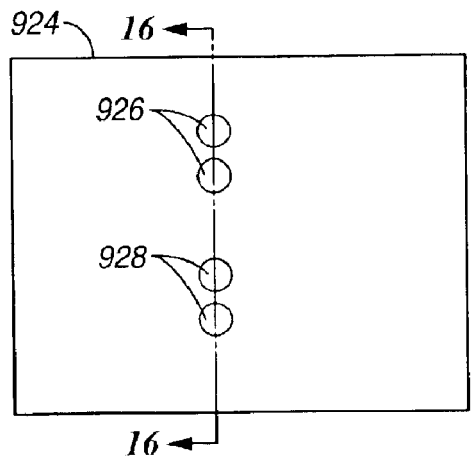
FIG. 15 is a top view of a circuit layer of an optical relay consistent with certain embodiments of the present invention.

A view of the exterior surface of a still further embodiment of the relay is shown in FIG. 15. The view shows a circuit layer 924. Electrical connections 926 and 928 may be solder balls for example. The section 16—16 is shown in FIG. 16.

Figure 16:
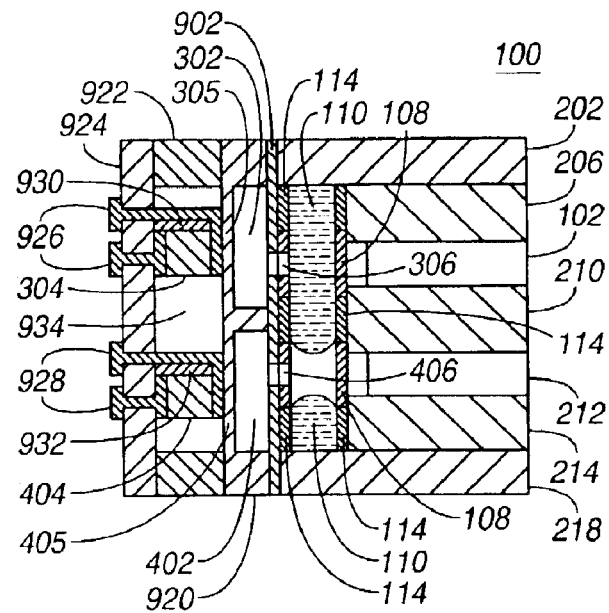
FIG. 16 is a sectional view through an optical relay consistent with certain embodiments of the present invention utilizing piezoelectric elements operating in an extensional mode.

FIG. 16 is a sectional view through the section 16—16 of the relay shown in FIG. 15. This embodiment includes four vertical layers: a connecting layer 902, a chamber layer 920, a piezoelectric layer 922 and a circuit layer 924. In this embodiment, the pressure in chamber 302 is controlled by the action of piezoelectric element 304. The piezoelectric element 304 is configured to deform in an extensional mode when a voltage is applied across it, and thereby deflect the diaphragm 305 that partially bounds the chamber 302. The polarity of the voltage determines whether the volume of the chamber 302 is increased or decreased, so the actuator may increase or decrease the pressure in the chamber. A corresponding piezoelectric actuator 404 controls the pressure in the lower chamber 402 by deflecting the diaphragm 405. Electrical connections 926 to the actuator 304 and electrical connection 928 to actuator 404 pass through the circuit layer 924 and facilitate the connection of external control signals. Alternatively, the connection may be traces formed on the circuit layer that terminate the edge of the layer. Insulators 930 and 932 ensure that the electric voltage is applied at the ends of the piezoelectric actuators 304 and 404. The slug may be moved downwards by increasing the pressure in chamber 302 and, optionally, decreasing the pressure in chamber 402. In the embodiment shown in FIG. 16, the transparent mirror housing 108 is in two portions positioned between the three contact pads 114.

Figure 17:
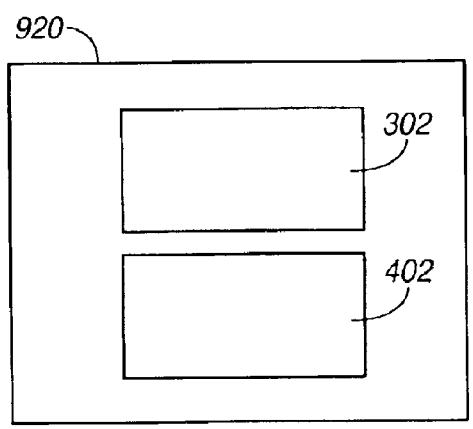
FIG. 17 is a view of a chamber layer of an optical relay consistent with certain embodiments of the present invention.

A view of the chamber layer 920 is shown in FIG. 17. This illustrates the upper pressure chamber 302 and the lower pressure chamber 402. In operation, these chambers contain an inert actuation fluid.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An optical relay comprising:
   a first input optical waveguide;
   a first output optical waveguide, optically aligned with the first input optical waveguide to form a first direct optical path;
   a second output optical waveguide intersecting the first input optical waveguide;
   a transparent mirror housing, located at the intersection of the first input optical waveguide and the second output optical waveguide;
   a liquid metal slug adapted to move within a switching channel passing through the transparent mirror housing, the liquid metal slug having a reflective surface;
   a first pressure actuator operable to move the liquid metal slug within the switching channel so that it blocks the first direct optical path and completes a first reflected optical path from the first input optical waveguide to the second output optical waveguide;
   a second pressure actuator operable to move the liquid metal slug within the switching channel to remove it from the first direct optical path; and
   a metal coating applied to a portion of the interior of the transparent mirror housing, the metal coating being wettable by liquid metal,
   wherein the transparent mirror housing is a triangular tube and the metal coating is applied to the corners of the transparent mirror housing, the metal coating tending to cause the liquid metal slug to form a reflective surface.

2. An optical relay comprising:
   a first input optical waveguide;
   a first output optical waveguide, optically aligned with the first input optical waveguide to form a first direct optical path;
   a second output optical waveguide intersecting the first input optical waveguide;
   a transparent mirror housing, located at the intersection of the first input optical waveguide and the second output optical waveguide;
   a liquid metal slug adapted to move within a switching channel passing through the transparent mirror housing, the liquid metal slug having a reflective surface;
   a first pressure actuator operable to move the liquid metal slug within the switching channel so that it blocks the first direct optical path and completes a first reflected optical path from the first input optical waveguide to the second output optical waveguide;
   a second pressure actuator operable to move the liquid metal slug within the switching channel to remove it from the first direct optical path;
   a first wettable metal contact located in the switching channel above the first direct and first reflected optical paths;
   a second wettable metal contact located in the switching channel below the first direct and first reflected optical paths; and
   a third wettable metal contact located in the switching channel below the second wettable metal contact.

3. An optical relay in accordance with claim 2, wherein the first direct optical path passes between the first and second wettable metal contacts and further comprising:
   a second input optical waveguide;
   a third output optical waveguide, optically aligned with the first input optical waveguide to form a second direct optical path passing between the second and third wettable metal contacts; and
   a fourth output optical waveguide intersecting the second input optical waveguide at the transparent mirror housing to form a second reflected optical path.

4. An optical relay in accordance with claim 2, wherein the first pressure actuator comprises:
   a first pressure chamber containing an actuation fluid; and
   a first duct opening to the first pressure chamber and to the switching channel between the first and second wettable metal contacts.

5. An optical relay in accordance with claim 4, wherein the second pressure actuator comprises:
   a second pressure chamber containing an actuation fluid; and
   a second duct opening to the second pressure chamber and to the switching channel between the second and third wettable metal contacts.

6. An optical relay in accordance with claim 5, further comprising a pressure relief duct opening the first and second pressure chambers.

7. An optical relay in accordance with claim 4, wherein the first pressure actuator further comprises:
   a heater resistor located within the first pressure chamber and operable to raise the temperature of the actuation fluid in the first pressure chamber.

8. An optical relay in accordance with claim 4, wherein the first pressure actuator further comprises:
   a heater resistor located within the first pressure chamber; and
   a phase-change liquid in wetted contact with the heater resistor;
   wherein the heater resistor operable to raise the temperature of the phase-change and thereby cause it to evaporate.

9. An optical relay in accordance with claim 4, wherein the first pressure actuator further comprises:
   a first pair of piezoelectric elements partially bounding the first pressure chamber and operable to deform in a shearing mode to change the volume of the first pressure chamber.

10. An optical relay in accordance with claim 9, wherein the first pressure actuator further comprises:
   a second pair of piezoelectric elements partially bounding the first pressure chamber and operable to deform in a shearing mode to change the volume of the first pressure chamber.

11. An optical relay in accordance with claim 4, wherein the first pressure actuator further comprises:
   a flexible diaphragm partially bounding the first pressure chamber;
   at least one piezoelectric element attached to the flexible diaphragm and operable to deform in a bending mode and thereby deflect the diaphragm;
wherein deflection of the flexible diaphragm alters the volume of the first pressure chamber.

12. An optical relay in accordance with claim 4, wherein the first pressure actuator further comprises:
   a flexible diaphragm partially bounding the first pressure chamber;
   a piezoelectric element attached to the flexible diaphragm and operable to deform in an extensional mode and thereby deflect the diaphragm;
wherein deflection of the flexible diaphragm alters the volume of the first pressure chamber.

13. An optical relay in accordance with claim 2, further comprising:
   a plurality of input optical waveguides;
   a plurality of first output optical waveguides, optically aligned with the plurality of input optical waveguides to form a plurality of direct optical paths;
   a plurality of second output optical waveguides intersecting the plurality of input optical waveguides at a plurality of intersections; and
   at each intersection of the plurality of intersections:
      a transparent mirror housing;
      a liquid metal slug moveably located within a channel passing through the transparent mirror housing, the liquid metal slug having a reflective surface;
      a first pressure actuator operable to move the liquid metal slug within the channel so that it blocks a direct optical waveguide of the plurality of direct optical waveguides and completes a reflected optical path from an input optical waveguides of the plurality of input optical waveguides to a second output optical waveguides of the plurality of second output optical waveguides;
      a second pressure actuator operable to move the liquid metal slug within the channel to remove the liquid metal slug from a direct optical waveguides of the plurality of direct optical waveguides;
      a first wettable metal contact located in the channel passing through the transparent mirror housing above the direct and reflected optical paths;
      a second wettable metal contact located in the channel passing through the transparent mirror housing below the direct and reflected optical paths; and
      a third wettable metal contact located in the channel passing through the transparent mirror housing below the second wettable metal contact.

14. A method for selecting between a direct optical path and a reflected optical path in an optical relay having a liquid metal slug moveable within a switching channel in response to the pressure of an actuation fluid, the method comprising:
   coupling an input optical signal to an input optical waveguide of the optical relay, the input optical waveguide being optically aligned with a first output optical waveguide to form the direct optical path;
   if the direct optical path is to be selected:
      energizing a first pressure actuator to move the liquid metal slug out of the direct optical path to a first position in the switching channel, whereby the input optical waveguide is optically coupled to first output optical waveguide; and
   if the reflected optical path is to be selected:
      energizing a second pressure actuator to move the liquid metal slug into the direct optical path to a second position in the switching channel, whereby the input optical signal is reflected from a surface of the liquid metal slug into a second output optical waveguide to complete the reflected optical path;
wherein the liquid metal slug is held in the first position by a first wettable metal contact and the liquid metal slug is held in the second position by a second wettable metal contact.

15. A method in accordance with claim 14, wherein energizing a pressure actuator of the first and second pressure actuators comprises:
   changing the pressure of the actuation fluid in a pressure chamber coupled to the switching channel.

16. A method in accordance with claim 14, wherein energizing a pressure actuator of the first and second pressure actuators further comprises:
   passing an electrical current through a heater resistor in the pressure chamber to increase the temperature of the actuation fluid.

17. A method in accordance with claim 14, wherein energizing a pressure actuator of the first and second pressure actuators further comprises:
   passing an electrical current through a heater resistor in the pressure chamber to increase the temperature of a phase-change liquid in wetted contact with the heater resistor and thereby cause the phase-change liquid to evaporate.

18. A method in accordance with claim 14, wherein energizing a pressure actuator of the first and second pressure actuators further comprises:
   applying an electrical voltage across a piezoelectric element partially bounding the pressure chamber to cause it to deform in a shearing mode and thereby alter the volume of the pressure chamber.

19. A method in accordance with claim 14, wherein energizing a pressure actuator of the first and second pressure actuators further comprises:
   applying an electrical voltage across a piezoelectric element attached to a diaphragm that partially bounds the pressure chamber to cause the piezoelectric element to deform in a bending mode, thereby deflecting the diaphragm and altering the volume of the pressure chamber.

20. A method in accordance with claim 14, wherein energizing a pressure actuator of the first and second pressure actuators further comprises:
   applying an electrical voltage across a piezoelectric element attached to a diaphragm that partially bounds the pressure chamber to cause the piezoelectric element to deform in an extensional mode, thereby deflecting the diaphragm and altering the volume of the pressure chamber.

21. A method for selecting between a direct optical path and a reflected optical path in an optical relay having a liquid metal slug moveable within a switching channel in response to the pressure of an actuation fluid, the method comprising:

coupling an input optical signal to an input optical waveguide of the optical relay, the input optical waveguide being optically aligned with a first output optical waveguide to form the direct optical path;

if the direct optical path is to be selected:

energizing a pressure actuator to change the pressure of the actuation fluid in a first direction and move the liquid metal slug out of the direct optical path to a first position in the switching channel, whereby the input optical waveguide is optically coupled to first output optical waveguide; and if the reflected optical path is to be selected:

energizing the pressure actuator to change the pressure of an actuation fluid in a second direction and move the liquid metal slug into the direct optical path to a second position in the switching channel, whereby the input optical signal is reflected from a surface of the liquid metal slug into a second output optical waveguide to complete the reflected optical path;

wherein the liquid metal slug is held in the first position by a first wettable metal contact and the liquid metal slug is held in the second position by a second wettable metal contact.

* * * * *

UNITED STATES PATENT AND TRADEMARK OFFICE
CERTIFICATE OF CORRECTION

PATENT NO.     : 6,925,223 B2
DATED          : August 2, 2005
INVENTOR(S)    : Wong It is certified that error appears in the above-identified patent and that said Letters Patent is hereby corrected as shown below:

<u>Title page,</u>
Item [56], References Cited, FOREIGN PATENT DOCUMENTS,
after "9/1990" insert -- G01L/23/1 --;
after "5/1987" insert -- H01H/29/2 --;
after "9/1999" insert -- G02B/26/2 --.

Signed and Sealed this

Sixth Day of December, 2005

JON W. DUDAS
*Director of the United States Patent and Trademark Office*